United States Patent [19]

Tajima et al.

[11] Patent Number: 5,532,570
[45] Date of Patent: Jul. 2, 1996

[54] VARIABLE SPEED CONTROL APPARATUS FOR INDUCTION MOTOR

[75] Inventors: Hirokazu Tajima; Hidetoshi Umida, both of Kawasaki, Japan

[73] Assignee: Fuji Electric Co., Ltd., Kawasaki, Japan

[21] Appl. No.: 407,312

[22] Filed: Mar. 20, 1995

[30] Foreign Application Priority Data

Mar. 18, 1994 [JP] Japan ...................................... 6-074401

[51] Int. Cl.$^6$ ........................................................ H02P 5/40
[52] U.S. Cl. ............................ 318/809; 318/804; 318/805
[58] Field of Search ....................................... 318/798, 799, 318/802, 803–804, 805, 806, 807, 808, 810, 812, 817, 809, 800, 432

[56] References Cited

U.S. PATENT DOCUMENTS

| | | | |
|---|---|---|---|
| 3,895,275 | 7/1975 | Rostad | 318/812 |
| 4,023,083 | 5/1977 | Plunkett | 318/805 |
| 4,926,105 | 5/1990 | Mischenko et al. | 318/800 |
| 5,272,429 | 12/1993 | Lipo et al. | 318/808 |
| 5,334,923 | 8/1994 | Lorenz et al. | 318/805 |

FOREIGN PATENT DOCUMENTS 0105511 4/1984 European Pat. Off. .
1008896 12/1989 Japan .

Primary Examiner—John W. Cabeca
Attorney, Agent, or Firm—Mark A. Catan; Joseph J. Petrokaitis; Thomas R. Morrison

[57] ABSTRACT

A variable speed control for induction motors with a primary angular frequency operating circuit has a multiplier that multiplies the output of a first regulator by a variable responsive to magnetic flux intensity. This first regulator holds the M axis induced voltage at zero. The primary angular frequency operating circuit corrects the primary angular frequency command value based on the output of the multiplier. An adder adds the output of a second regulator circuit and the output of the primary angular frequency operating circuit. The second regulator regulates (by proportional or proportional-integral control) the deviation between the command value of the torque current, or the torque and an actual value, to zero. In another embodiment, the magnetic flux operating circuit calculates a first value and a second value. The first value is obtained by adding a result of multiplication of a reference frequency value by a magnetic flux command value and an absolute value of an induced voltage or a T axis induced voltage. The second value is the sum of the reference frequency value and an absolute value of the primary angular frequency command value. The magnetic flux operating circuit divides the first value by the second and obtains a calculated magnetic flux value by passing the result of the division through a low pass filter. The calculated magnetic flux value serves as an equivalent of the magnetic flux, which is a necessary input of the primary angular frequency operating circuit and the magnetic flux regulator.

18 Claims, 8 Drawing Sheets

VARIABLE SPEED CONTROL APPARATUS FOR INDUCTION MOTOR

BACKGROUND OF THE INVENTION

This invention relates to a variable speed control apparatus for controlling induction motors by the transvector control method. Transvector control systems, which control motors without using a speed sensor, are known. For example, motor controllers of such design are disclosed in Japanese Laid Open Patent Publications No. S64-8896, and No. H0 1-198292. In such systems, control is effected using a primary angular frequency for detecting a position of a magnetic flux axis based on the induced voltage of the motor 2.

Referring to FIGS. 3, 15, and 16, the operation of the primary angular frequency operating means 200' of a variable speed control according to the prior art will be briefly explained. FIG. 3 is a vector diagram of an induced voltage vector E. FIG. 15 is a block diagram of the variable speed control of the prior art, which is similar to the variable speed control apparatuses described in the above laid open publications. FIG. 16 is a block circuit diagram showing a primary angular frequency operating means 200' of FIG. 15. An absolute value operating circuit 53 calculates an absolute value $|E_T|$ of a T axis component $E_T$ (T axis induced voltage) of an induced voltage vector E. An M axis is an axis of a rotating coordinate system (M,T axes) lying in a direction of magnetic flux, and the T axis is an axis perpendicular to the M axis. The absolute value $|E_T|$ of the T axis component of voltage vector E is fed to a divider 28. The divider 28 calculates a primary angular frequency by dividing the absolute value $|E_T|$ of the T axis component of voltage vector E by a magnetic flux command value $\phi_2^*$.

As FIG. 3 shows, an M axis component $E_M$ (M axis induced voltage) of induced voltage vector E has a non-zero magnitude when a phase angle command value $\theta^*$, differs from an actual phase angle value $\theta$ of motor 2. Phase angle command value $\theta^*$ is generated by an integrator 102 of FIG. 15. To eliminate this difference, thereby insuring that the phase angle command value $\theta^*$ represents the actual phase angle value $\theta$, primary angular frequency operating means 200' regulates its output to maintain M axis component $E_M$, of induced voltage vector E, at zero. The regulation accomplished by a regulator 52. The M axis component $E_M$, of induced voltage vector, E is applied to an input of regulating means 52. The output of output of regulating means 52 is applied to a negative input of an adder 55. The output of divider 28 is applied to the positive input of adder 55 to generate an absolute value of a primary angular frequency command value $|\omega_1^*|$. Regulating means 52 may be a proportional (P) controller or proportional-integral (P-I) controller. This control operation adjusts an absolute value of a primary angular frequency command value $|\omega_1^*|$ so that the phase angle command value $\theta^*$ coincides with the actual phase angle $\theta$. The final primary angular frequency command value $\omega_1^*$ is generated by detecting the polarity of $E_T$ in a polarity detecting circuit 54, and multiplying the detected polarity (sign) by the absolute value of the primary angular frequency command value $|\omega_1^*|$ in a multiplier 51.

Primary angular frequency command value $\omega_1^*$, output by primary angular frequency operating means 200', is applied to an input of an integrator 102 of the prior art variable speed control (FIG. 15). Integrator 102, a means for generating a magnetic flux position, generates the phase angle command value $\theta^*$. The phase angle command value $\theta^*$ is used for voltage and current vector rotation in vector rotators 11 and 24, and for coordinate transformation, in a coordinate transformer 8. An adder 202 calculates an estimated speed value $\omega_r$ by subtracting a slip frequency command value $\omega_s^*$, calculated in a slip frequency operator 101, from $\omega_1^*$. (Note that the ^ symbol indicates estimated values in the figures, however, this symbol does not appear in the specification to denote the corresponding terms.) The estimated speed value $\omega_r$ is used for speed control of an induction motor 2. Slip frequency command value $\omega_s^*$ is generated by slip frequency operator 101 according to the following equation:

$$\omega_s^* = \frac{I_T \cdot R_2}{\phi_2} \quad (a)$$

where $R_2$ is a resistance.

An actual magnetizing current value $I_M$ and an actual torque current value $I_T$ are generated as follows. A primary current of induction motor 2 is detected by a current detector 203, and resolved in a three-phase/two-phase transformer 12 into two-phase current components $i_\alpha$, $i_\beta$ of the stator coordinate system. Two-phase values $i_\alpha$, $i_\beta$ are further transformed in a vector rotator 11 to the actual magnetizing and torque current values $I_M$ and $I_T$ on the rotating coordinate (M-T axes) defined with respect to the axis of magnetic flux.

A magnetic flux regulator 4 generates a magnetizing current command value $I_M^*$ responsively to the magnetic flux command value $\phi_2^*$. A speed regulator 5 generates a torque current command value $I_T^*$ responsively to a speed command value $\omega_r^*$ and the estimated speed value $\omega_r$. Magnetic flux regulator 4 and speed regulator 5 may be proportional (P) or proportional-integral (P-I) controllers. Speed regulator 5 may be a series compensated P or P-I controller, to which a difference of speed command value $\omega_r^*$ and estimated speed value $\omega_r$, generated by an adder (not shown), is applied as an input.

Magnetizing current command value $I_M^*$ and torque current command value $I_T^*$ are applied to inputs of a current regulator 6. Current regulator 6 generates an M component $V_M^*$ (magnetizing voltage command value) and a T component $V_T^*$ (torque voltage command value) of a primary voltage command value from the command values $I_M^*$, $I_T^*$ and the actual values $I_M$, $I_T$. Current regulator 6 may be a pair of independent series compensated P or P-I controllers. In such case, a signal from an adder (not shown), equal to the difference between $I_M^*$ and $I_M$, is fed to a first of the controllers and used to generate $V_M^*$. A signal from another adder (not shown), equal to the difference between $I_T^*$ and $I_T$, is fed to a second of the controllers and used to generate $V_T^*$.

The voltage command values $V_M^*$, $V_T^*$ are transformed by coordinate transforming circuit 8 to generate two-phase values $v_\alpha^*$, $v_\beta^*$ based on phase angle command value $\theta^*$ supplied by integrator 102. Coordinate transforming circuit 8 rotates vector $[V_M^*, V_T^*]$ to obtain vector $[v_\alpha^*, v_\beta^*]$ according to equation b:

$$\begin{bmatrix} v_\alpha^* \\ v_\beta^* \end{bmatrix} = \begin{bmatrix} \cos\theta^* & -\sin\theta^* \\ \sin\theta^* & \cos\theta \end{bmatrix} \begin{bmatrix} V_M^* \\ V_T^* \end{bmatrix} \quad (b)$$

Two-phase values $v_\alpha^*$, $v_\beta^*$ are further converted in a pulse generating circuit 9 to drive pulses (as described in connection with FIG. 1) for driving a PWM inverter 1.

A voltage detector 20 and a three-phase/two-phase transformer 21 are used to generate two-phase values $v_\alpha$ and $v_\beta$. The vector rotator 24 generates magnetizing and torque voltages $V_M$ and $V_T$ from two-phase values $v_\alpha$ and $v_\beta$. Induced voltage operating circuit 22 generates the M and T axis components of the induced voltage $E_M$ and $E_T$ according to equation c:

$$E_M = V_M - (R_1 + pL\sigma) \cdot I_M + \omega_1 \cdot L\sigma \cdot I_T$$

$$E_T = V_T - (R_1 + pL\sigma) \cdot I_T + \omega_1 \cdot L\sigma \cdot I_M \quad (c)$$

OBJECTS AND SUMMARY OF THE INVENTION

In the prior art variable speed control of FIG. 15, regulating means 52 performs proportional or proportional-integral control to maintain the M axis induced voltage $E_M$ at zero. The output of regulating means 52 is added directly to the absolute value of the primary angular frequency $|\omega_1^*|$. With this configuration, in a field-weakening region of operation in which the magnetic flux intensity of the induction motor 2 is weakened, the proportional gain of regulating means 52 may be too great, relative to the intensity of the magnetic flux, for good control. The effect of the large proportional gain of the regulating means 52 on the primary angular frequency command value $\omega_1^*$ and may prevent stable and smooth driving of the induction motor 2.

Since the induced voltage falls to low values in the low-speed driving range, there is an attending decrease in signal-to-noise (S/N) ratio of the detected voltage signal. This can result in substantial error in the primary angular frequency command value $\omega_1^*$, which is obtained by dividing the absolute value of the T axis induced voltage value $|E_T|$ by the magnetic flux intensity. Since, in practice, the magnetic flux command value $\phi_2^*$ substitutes for the magnetic flux intensity in the above division, and the magnetic flux command value $\phi_2^*$ may deviate substantially from the actual value of the magnetic flux depending on the driving conditions of the induction motor, significant error can result in the primary angular frequency command value $\omega_1^*$.

In view of the foregoing, it is a first object of the invention to provide a variable speed control apparatus for an induction motor which facilitates driving the induction motor stably and smoothly even in the field weakening range.

It is a second object of the invention to provide a variable speed control apparatus for an induction motor which reduces operational error of the primary angular frequency command value in a low speed driving range.

It is a third object of the of the invention to provide a variable speed control apparatus for an induction motor which reduces operational error of a magnetic flux equivalent which is necessary for calculating the primary angular frequency command value from the induced voltage.

Briefly, a variable speed control for induction motors with a primary angular frequency operating means has a multiplier that multiplies the output of a first regulator by a variable responsive to magnetic flux intensity. This first regulator holds the M axis induced voltage at zero. The primary angular frequency operating means corrects the primary angular frequency command value based on the output of the multiplier. An adder adds the output of a second regulator means and the output of the primary angular frequency operating means. The second regulator regulates (by proportional or proportional-integral control) the deviation between the command value of the torque current, or the torque and an actual value, to zero. In another embodiment, the magnetic flux operating means calculates a first value and a second value. The first value is obtained by adding a result of multiplication of a reference frequency value by a magnetic flux command value to an absolute value of a T axis component of an induced voltage vector. The second value is the sum of the reference frequency value and an absolute value of the primary angular frequency command value. The magnetic flux operating means divides the first value by the second and obtains a calculated magnetic flux value by passing the result of the division through a low pass filter. The calculated magnetic flux value serves as an equivalent of the magnetic flux, which is a necessary input of the primary angular frequency operating means and the magnetic flux regulator.

According to an embodiment of the present invention, there is described, a variable speed control apparatus for an induction motor comprising: power converting means, capable of controlling magnitude, frequency and phase of a voltage supply generated by the power converting means, for powering the induction motor, means for detecting a primary current of the output voltage supply and resolving the primary current into a magnetizing current component and a torque current component, means for generating an angular position of a magnetic flux, used for independently controlling the magnetizing current component and the torque current component, whereby at least a torque of the induction motor is controlled, means for generating an induced voltage vector of the induction motor, means for generating a magnetic flux axis component of the induced voltage vector and a torque axis component of the induced voltage vector responsively to the angular position of a magnetic flux, first regulating means for regulating the magnetic flux axis component at zero by generating a first control signal to which the magnetic flux axis is responsive, means for adjusting a gain of the first control signal in a field weakening operating range of the induction motor to produce a gain-adjusted control signal, means for generating an absolute value of the torque axis component and dividing the absolute value by an equivalent of a magnetic flux of the induction motor and means for subtracting the gain-adjusted control signal from a result of the dividing and making a polarity of a result of the subtracting equal to a polarity of the magnetic flux axis component to generate a primary angular frequency command signal.

According to another embodiment of the present invention, there is described, a variable speed control apparatus for an induction motor comprising: power converting means, capable of controlling magnitude, frequency and phase of a voltage supply generated by the power converting means, for powering the induction motor, means for detecting a primary current of the output voltage supply and resolving the primary current into a magnetizing current component and a torque current component, means for generating an angular position of a magnetic flux, used for independently controlling the magnetizing current component and the torque current component, whereby at least a torque of the induction motor is controlled, means for generating an induced voltage vector of the induction motor, means for generating a magnetic flux axis component of the induced voltage vector and a torque axis component of the induced voltage vector responsively to the angular position of a magnetic flux, first regulating means for regulating the magnetic flux axis component at zero by generating a first control signal to which the magnetic flux axis is responsive, means for adjusting a gain of the first control signal in a field weakening operating range of the induction motor to produce a gain-adjusted control signal, means for generating a magnitude of the induced voltage vector and dividing the absolute value by an equivalent of a magnetic flux of the induction motor and means for subtracting the gain-adjusted control signal from a result of the dividing and making a polarity of a result of the subtracting equal to a polarity of the magnetic flux axis component to generate a primary angular frequency command signal.

According to still another embodiment of the present invention, there is described, a variable speed control apparatus for an induction motor comprising: power converting means, capable of controlling magnitude, frequency and phase of a voltage supply generated by the power converting means, for powering the induction motor, means for detecting a primary current of the output voltage supply and resolving the primary current into a magnetizing current component and a torque current component, means for generating an angular position of a magnetic flux, used for independently controlling the magnetizing current component and the torque current component, whereby at least a torque of the induction motor is controlled, means for generating an induced voltage vector of the induction motor, means for generating a magnetic flux axis component of the induced voltage vector and a torque axis component of the induced voltage vector responsively to the position of a magnetic flux, first regulating means for regulating the magnetic flux axis component at zero by generating a first control signal to which the magnetic flux axis is responsive, means for adjusting a gain of the first control signal in a field weakening operating range of the induction motor to produce a gain-adjusted control signal, means for generating making a polarity of the gain-adjusted control signal equal to a polarity of the torque axis component to generate a polarized gain-adjusted signal, means for dividing torques axis component by an equivalent of a magnetic flux of the induction motor and means for subtracting the polarized gain-adjusted signal from a result of the dividing to generate a primary angular frequency command signal.

The above, and other objects, features, and advantages of the present invention will become apparent from the following description read in conjunction with the accompanying drawings, in which like reference numerals designate the same elements.

DETAILED DESCRIPTION OF THE PREFERRED EMBODIMENT

Referring, to FIGS. 2, 3, 15, and 16, in the induction motor 2, the M axis induced voltage $E_M$, the T axis induced voltage $E_T$, the primary angular frequency $\omega_1$ and the secondary magnetic flux $\phi_2$ are related as in equation 1:

$$\omega_1 = \text{sgn}(E_T)(|E|/\phi_2) = \text{sgn}(E_T)|\sqrt{(E_M^2 + E_T^2)}|\phi_2 \qquad (1)$$

where $\text{sgn}(E_T)$ represents the polarity (+,−) of $E_T$. Since the M axis is parallel to the direction of the secondary magnetic flux $\phi_2$, transvector control forces the M axis induced voltage $E_M$ to zero as indicated in equation 2:

$$E_M = 0 \qquad (2)$$

in which case equation 3 becomes:

$$\omega_1 = E_T \qquad (3)$$

Figure 3:
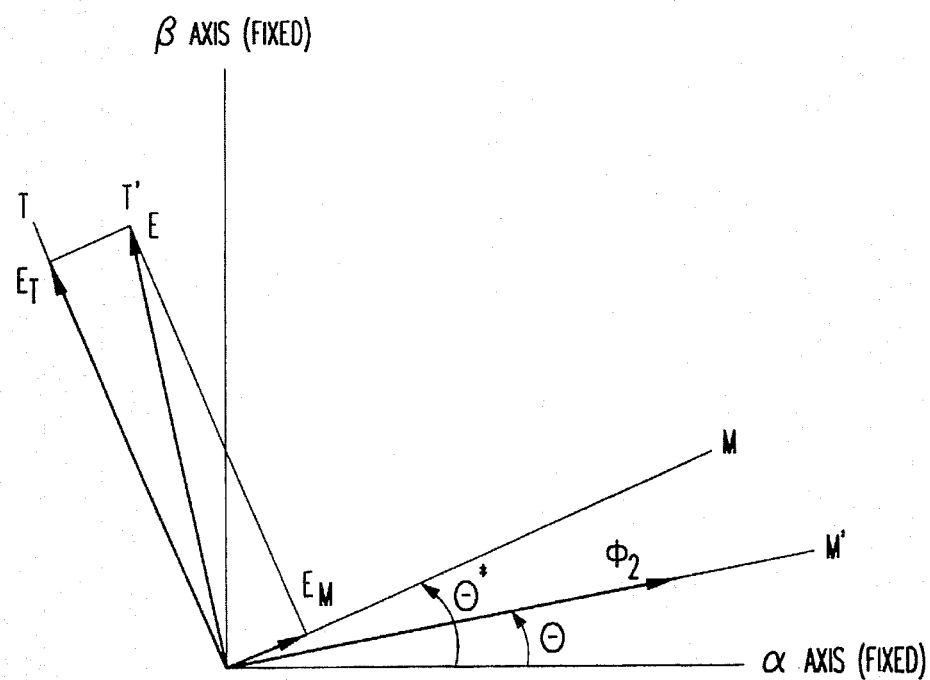
FIG. 3 is a vector diagram illustrating the components of the induced voltage etc.

Transvector control of the induction motor 2 is accomplished without sensing the speed of the induction motor. Instead, a phase angle command value $\theta^*$ is generated by integrating the primary angular frequency command value $\omega_1^*$, calculated from equation 1 or 3, and obtaining a position of the magnetic flux. FIG. 3 is a voltage vector diagram of induction motor 2 when the phase angle command value $\theta^*$ is unequal to the actual phase angle $\theta$ of the motor. The rotating coordinate based on the phase angle command value $\theta^*$ corresponds to the M-T axes. The rotating coordinate based on the actual phase angle $\theta$ corresponds to the M'-T' axes. Since the direction of the induced voltage vector E coincides with the direction of the T' axis, the M axis induced voltage $E_M$ assumes a value corresponding to the difference between the command value and actual phase angles $\theta^*$ and $\theta$; that is, the error in the phase angle.

As FIG. 3 indicates, M axis induced voltage $E_M$ is greater than zero when phase angle command value $\theta^*$ is greater than actual phase angle $\theta$ ($\theta^*$ is advanced). M axis induced voltage $E_M$ is less than zero when phase angle command value $\theta^*$ is less than actual phase angle $\theta$ ($\theta^*$ is retarded). Therefore, by inputting $E_M$ to regulating means 52, and subtracting the resulting output of regulating means 52 from the result of the division of $|E_T|$ by the magnetic flux command value $\phi_2^*$, the absolute value $|\omega_1^*|$ of the primary angular frequency command value is adjusted to maintain the M axis induced voltage $E_M$ at zero. Because the sign of the primary angular frequency $\omega 1$ and the T axis induced voltage $E_T$ coincide with each other, the final primary angular frequency command value $\omega_1^*$ is obtained by multiplying the sign of $E_T$ with the absolute value of the primary angular frequency. As a result of the correction performed by primary angular frequency operating means 200', M axis induced voltage $E_M$ is maintained at 0. Thus, the value representing the phase angle of the motor $\theta^*$, generated by the magnetic flux position operating means, represents the actual phase angle of the motor.

The primary angular frequency command value $\omega_1^*$ is calculated from equation 4. In equation 4, $G_{em}$ is a transfer function of the first regulating means to which $E_M$ is input:

$$\omega_1^* = \text{sgn}(E_T)[(|E_T|/\phi_2) - G_{em}E_M] \quad (4)$$

Figure 16:
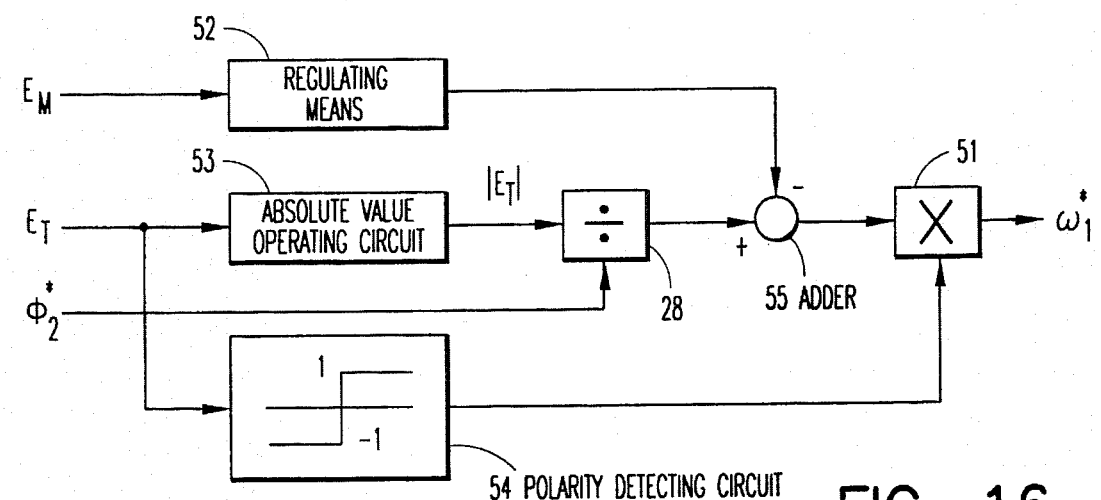
FIG. 16 is a block diagram of a primary angular frequency operating means according to the prior art.
Figure 15:
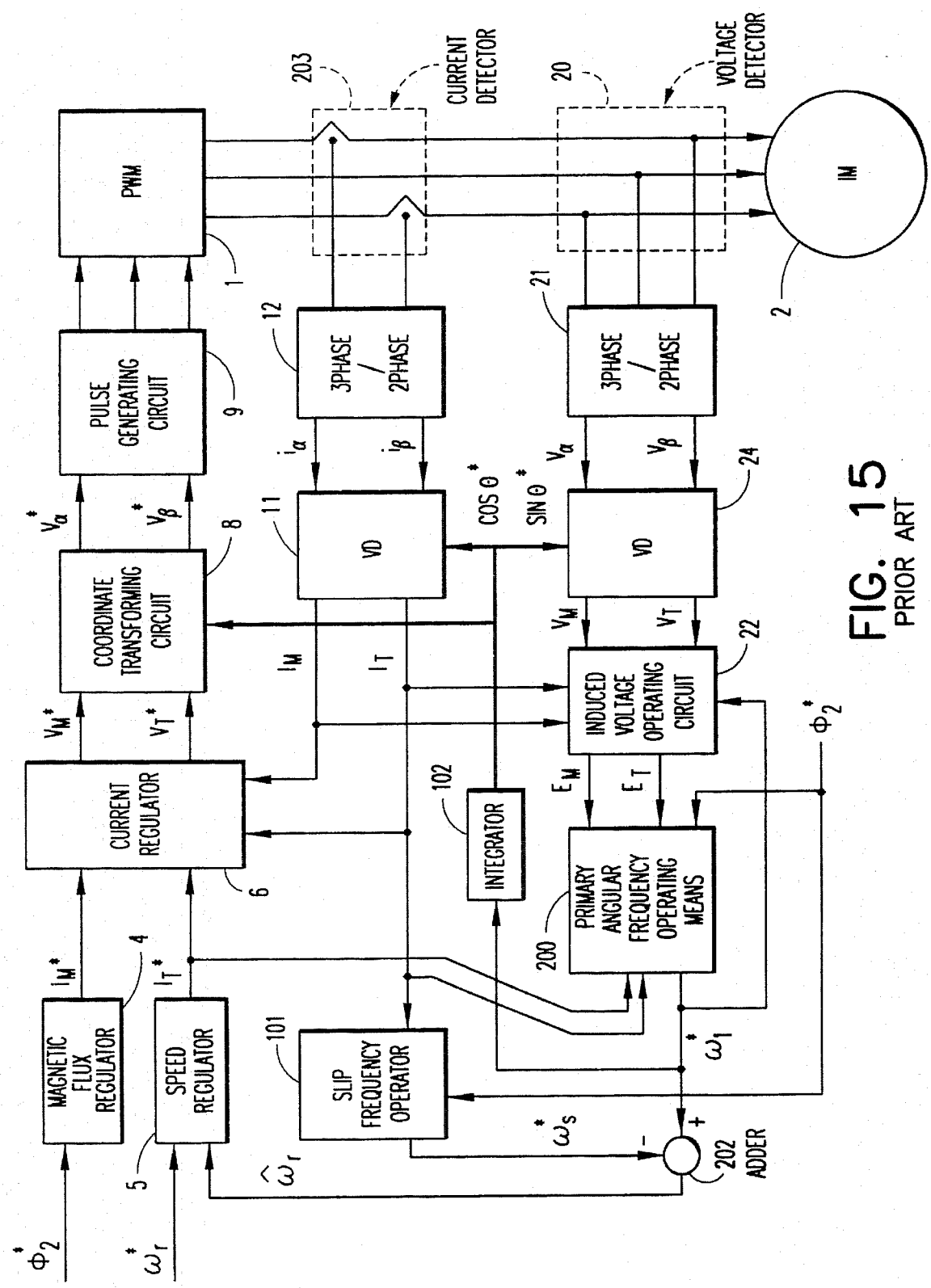
FIG. 15 is a block diagram of a variable speed control according to the prior art.

The prior art primary angular frequency operating means 200' of FIG. 16 uses the magnetic flux command value $\phi_2^*$ instead of the actual secondary magnetic flux value $\phi_2$ (which cannot be detected directly).

Figure 4:
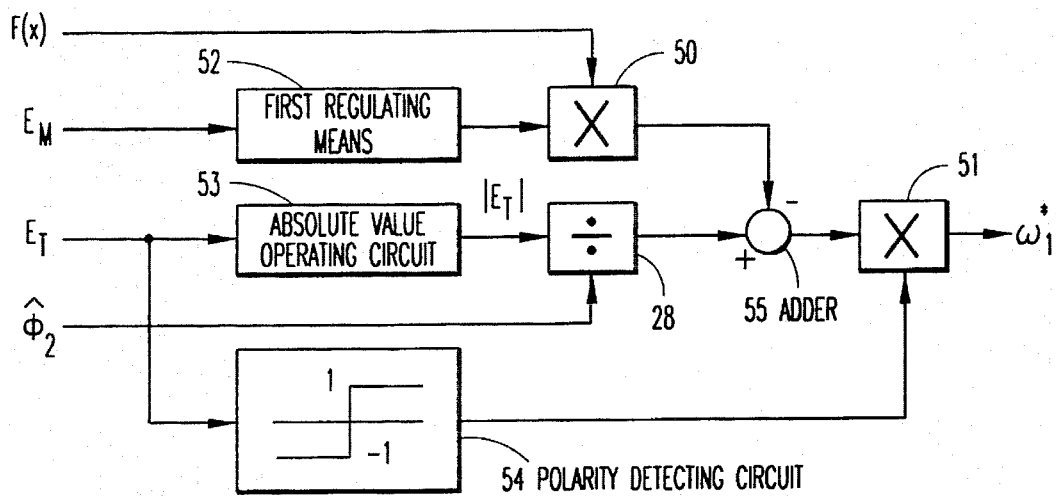
FIG. 4 is a block diagram of the first embodiment of a primary angular frequency operating means of FIG. 1.

Referring now also to FIG. 4, in the field weakening range in which the magnetic flux intensity is small, the magnetizing current becomes small relative to the torque current and the phase angle of the magnetic flux tends to change. Therefore, it is necessary to reduce the gain of the regulating means (52 in the prior art controller of FIG. 15) to insure that the motor is driven stably and smoothly. In view of this, the present invention achieves stable and smooth driving of the motor by reducing the gain of a regulating means (corresponding to regulating means 52 of FIG. 16) in the field weakening range. This is accomplished by multiplying the output of the regulating means by a variable $F(x)$ which varies responsively to the intensity of the magnetic flux. In practice, $E_M$ in the correction term of equation 4 is multiplied by the variable $F(x)$. Such a correction of $\omega_{1*}$, is expressed by equation 5:

$$\omega_{1*} = \text{sgn}(E_T)[(|E_T|/\phi_2) - G_{em}F(x)E_M] \quad (5)$$

Since the induced voltage is small in the low speed driving range, a small error in the detected voltage can result in relatively large error in the primary angular frequency command value $\omega_1^*$.

Figure 7:
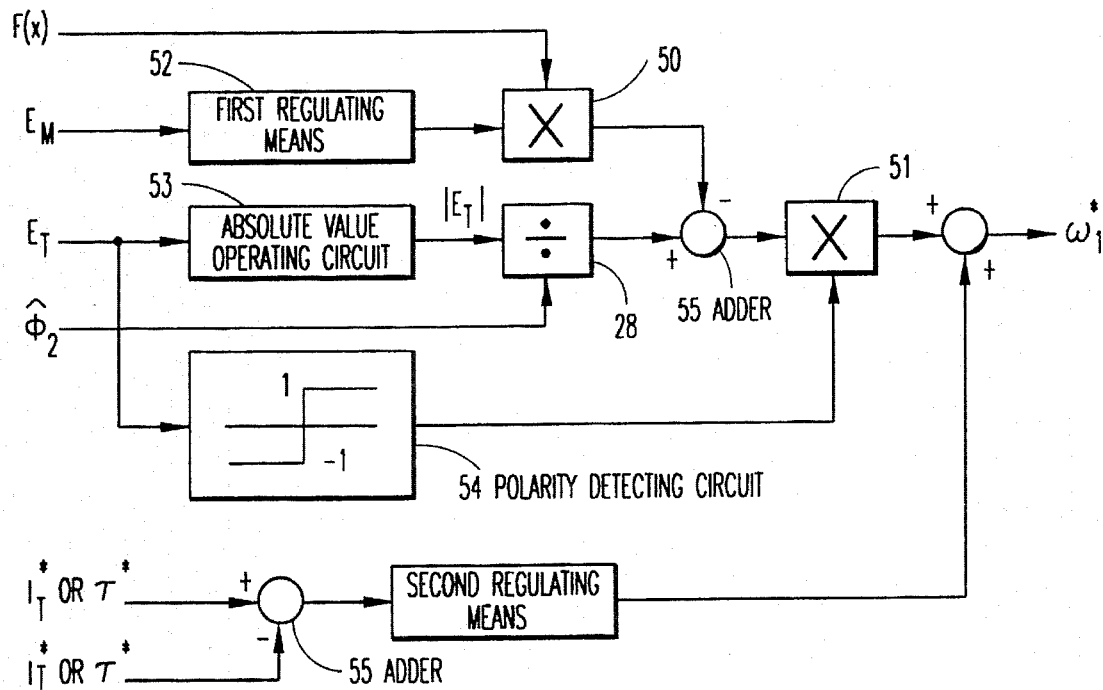
FIG. 7 is a block diagram of the fourth embodiment of the primary angular frequency operating means of FIG. 1.

Referring now also to FIG. 7, the speed of induction motor 2 varies with variation of the torque current or torque. In one embodiment of the invention, the primary angular frequency command value $\omega_1^*$ is adjusted at low speed by adding an output of a second regulating means 61. Second regulating means 61 outputs a control signal to maintain the torque current $I_T$ equal to the torque current command value $I_T^*$, or a torque $\tau$ equal to a torque command value $\tau^*$. Error in $\omega_1^*$ is also reduced by the present invention, since the current value has more significant figures, than the data representing the induced voltage, in the low speed range. Thus, the present variable speed control apparatus achieves stable and smooth driving of the induction motor.

Because the prior art variable speed control uses the magnetic flux command value $\phi_2^*$ in place of the actual magnetic flux, which is required to generate the primary angular frequency command value $\omega_1^*$, an error results when the secondary magnetic flux of the motor varies significantly.

Setting $E_M=0$, and by modifying equation 1, equation 6 is obtained:

$$\phi_2 = |E_T/\omega_1| \quad (6)$$

If equation 6 is used as is for calculating the secondary magnetic flux $\phi_2$, it is difficult to calculate the secondary magnetic flux $\phi_2$, since both $E_T$ and $\omega_1$ are very small in the low speed driving range. To avoid this, the variable speed control apparatus of the present invention introduces a reference frequency value $\alpha$, which has a finite value, and derives a calculated magnetic flux value $\phi_2$.

$$\phi_2 = (\alpha\phi_2^* + |E_T|)/(\alpha + |\omega_1^*|) \quad (7)$$

In the low speed range, in which $E_T$ is very small, when the primary angular frequency command value $\omega_1^*$ is substantially smaller than the reference frequency value $\alpha$, $\phi_2 = \phi_2^*$, as can be seen by inspecting equation 7. When the primary angular frequency command value $\omega_1^*$ is substantially greater than the reference frequency value $\alpha$, $\phi_2 = |E_T/\omega_1^*|$, which is the same result obtained from equation 6.

Using equation 7, the magnetic flux can be calculated, with little error, over the entire speed range. However, primary angular frequency command value $\omega_1^*$ and calculated magnetic flux value $\phi_2$ cannot be calculated simultaneously. This is because the primary angular frequency command value $\omega_1^*$ is required in equation 7 to calculate the calculated magnetic flux value $\phi_2$, while the calculated magnetic flux value $\phi_2$ is required in equation 5 to calculate the primary angular frequency command value $\omega_1^*$. Fortunately, the primary angular frequency $\omega_1$ changes instantaneously, while the secondary magnetic flux $\phi_2$ changes at a slow speed determined by a secondary time constant of the motor. Taking advantage of this difference, the variable speed control of the present invention solves equations 5 and 7 by connecting to the output of a magnetic flux operating means (See FIG. 10), a low pass filter (described later) so that $\phi_2$ changes at a (slower) speed corresponding to the secondary time constant of the motor. With the above arrangement, $\omega_1^*$ and $\phi_2$ are calculated separately.

Hereinafter, the present invention is described in detail with reference to the accompanying figures which illustrate the preferred embodiments of the present invention.

Figure 1:
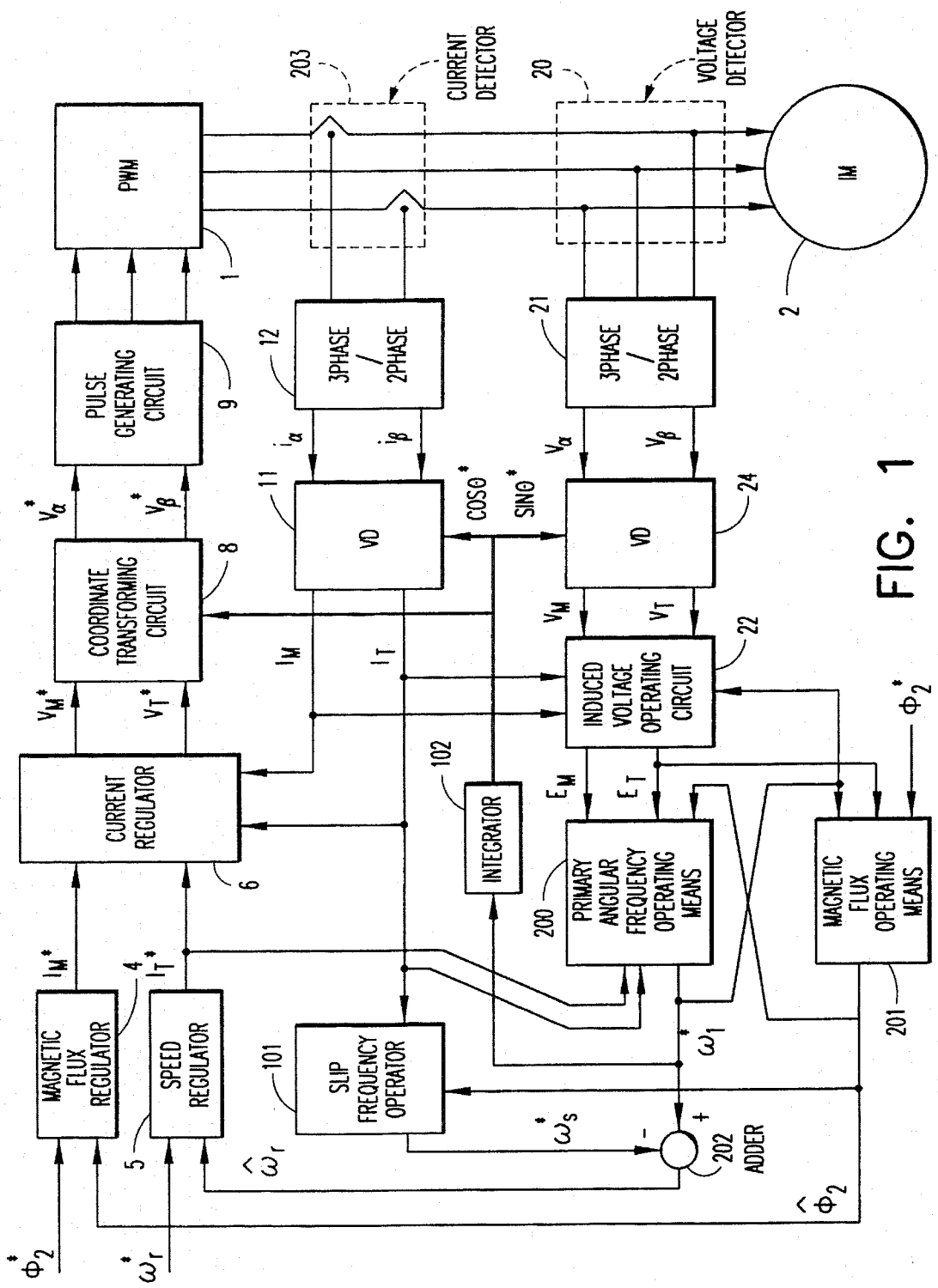
FIG. 1 is a block diagram of a variable speed control according to the present invention.
Figure 2:
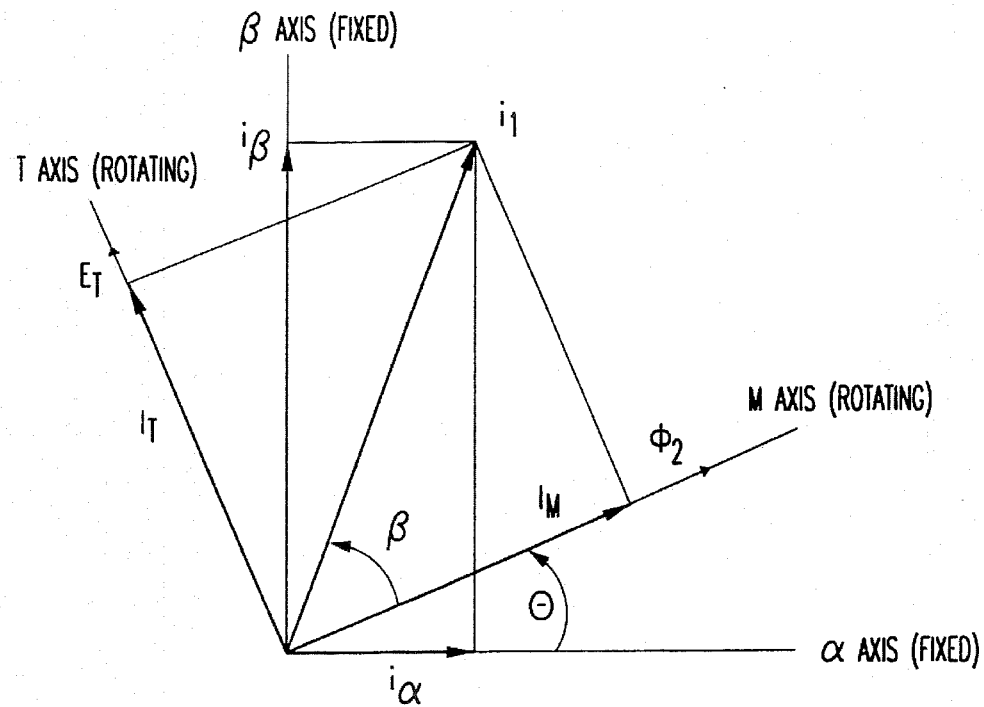
FIG. 2 is a vector diagram illustrating the relation between the voltage, the current and the magnetic flux of the induction motor.

Referring to FIG. 1, a block diagram of a variable speed control according to the present invention, is shown. The variable speed control apparatus of FIG. 1 is common to all the embodiments of the present invention. In FIG. 1, a primary current of a motor 2 is resolved, in a three-phase/two-phase transformer 12, into two-phase current components $i_\alpha$, $i_\beta$ of the stator coordinate system. The two-phase current components $i_\alpha$, $i_\beta$, are further transformed in a vector rotator 11 to an actual magnetizing current value $I_M$ and an actual torque current value $I_T$ on the M-T coordinate system defined with respect to the axis of magnetic flux.

A magnetic flux regulator 4 generates a magnetizing current command value $I_M^*$ from a deviation between a magnetic flux command value $\phi_2^*$ and a calculated magnetic flux $\phi_2$. Magnetic flux regulator 4 may be a series compensated proportional (P) or proportional-integral (P-I) controller to whose input a signal, equal to a difference of $\phi_2^*$ and a calculated magnetic flux $\phi_2$, is applied. A speed regulator 5 generates a torque current command value $I_T^*$ from a speed command value $\omega_r^*$ and the estimated speed value $\omega_r$. Speed regulator 5 may be a series compensated P or P-I controller to whose input, a signal, equal to a difference of speed command value $\omega_r^*$ and estimated speed value $\omega_r$, is applied.

A current regulator 6 generates an M component $V_M^*$ and a T component $V_T^*$ of a primary voltage command value from the magnetizing and torque current command values $I_M^*$, $I_T^*$ and the actual magnetizing and torque current values $I_M$, $I_T$. Current regulator 6 may include a pair of independent series compensated P or P-I controllers. In such case, an error signal equal to the difference between $I_M^*$ and $I_M$ is fed to a first of the controllers and used to generate the M component of the primary voltage command value $V_M^*$. An error signal equal to the difference between $I_T^*$ and $I_T$ is fed to a second of the controllers and used to generate the T component of the primary voltage command value $V_T^*$. The respective difference inputs may be generated by respective adders (not shown).

The M and T components of the primary voltage command values $V_M^*$, $V_T^*$ are applied to and transformed, by a coordinate transforming circuit 8, to two-phase values $v_\alpha^*$, $v_\beta^*$. Output of integrator 102 is applied to coordinate transforming circuit 8 and used to rotate vector $[V_M^*, V_T^*]$ to obtain vector $[v_\alpha^*, v_\beta^*]$ according to equation 8 (which is the same as equation b, above:

$$\begin{bmatrix} v_\alpha^* \\ v_\beta^* \end{bmatrix} = \begin{bmatrix} \cos\theta^* & -\sin\theta^* \\ \sin\theta^* & \cos\theta \end{bmatrix} \begin{bmatrix} V_M^* \\ V_T^* \end{bmatrix} \quad (8)$$

The two-phase values $v_\alpha^*$, $v_\beta^*$ are further converted in a pulse generating circuit 9 to drive pulses for driving a PWM inverter 1. Pulse generating circuit first converts two-phase values $v_\alpha^*$, $v_\beta^*$ to three signals $v_u^*$, $v_v^*$, and $v_w^*$ according to equation 9:

$$\begin{bmatrix} v_u^* \\ v_v^* \\ v_w^* \end{bmatrix} = \begin{bmatrix} 1 & 0 \\ -1/2 & \sqrt{3}/2 \\ -1/2 & -\sqrt{3}/2 \end{bmatrix} \begin{bmatrix} v_\alpha^* \\ v_\beta^* \end{bmatrix} \quad (9)$$

In pulse generating circuit 9, each of $v_u^*$, and $v_v^*$, $v_w^*$ is applied to the positive input of a respective comparator (not shown). The negative input of each comparator is connected to outputs of triangular wave generating circuits (not shown). The outputted drive pulse trains are applied to the pulse-width modulating (PWM) inverter to drive induction motor 2.

The estimated speed value $\omega_r$ is generated by an adder 202, which subtracts a slip frequency command value $\omega_s^*$ from the primary angular frequency command value $\omega_1^*$. A slip frequency operator 101 generates the slip frequency command value $\omega_s^*$ based on the actual torque current value $I_T$ and the calculated magnetic flux $\phi_2$. Slip frequency operator 101 may generate slip frequency command value $\omega_s^*$ according to equation 10, for example:

$$\omega_s^* = \frac{I_T \cdot R_2}{\phi_2} \quad (10)$$

where $R_2$ is a resistance. The calculated magnetic flux $\phi_2$ is obtained from a magnetic flux operating means 201.

A voltage detector 20 and a three-phase/two-phase transformer 21 are used to generate two-phase values $v_\alpha$ and $v_\beta$. A vector rotator 24 generates magnetizing and torque voltages $V_M$ and $V_T$ from two-phase values $v_\alpha$ and $v_\beta$. Induced voltage operating circuit 22 generates the M and T axis components of the induced voltage $E_M$ and $E_T$ according to equation 11 (which is the same as equation c, above):

$$E_M = V_M - (R_1 + pL\sigma) \cdot I_M + \omega_1^* \cdot L\sigma \cdot I_T$$
$$E_T = V_T - (R_1 + pL\sigma) \cdot I_T + \omega_1^* \cdot L\sigma \cdot I_M \quad (11)$$

where p is a differential operator. According to equation 11, the M and T axis components of the induced voltage $E_M$ and $E_T$ are obtained by subtracting the voltage drop due to wire resistance $R_1$ and leak inductance $L\sigma$ of motor 2.

Referring to FIG. 4 the principle for generating the primary angular frequency command value is similar to that described in the Japanese Laid Open Patent Publication S64-8896. An absolute value operating circuit 53 calculates an absolute value of the T axis induced voltage $E_T$. The absolute value of the T axis induced voltage $E_T$ is applied to a divider 28. The divider 28 divides the absolute value of the T axis induced voltage $E_T$ by the calculated magnetic flux $\phi_2$ according to equation 3, and outputs an absolute value $|\omega_1|$ of the primary angular frequency. The sign of the primary angular frequency $\omega_1$ coincides with the sign of the T axis induced voltage $E_T$. Therefore, the primary angular frequency command value $\omega_1^*$, which has the same polarity as the T axis induced voltage $E_T$, can be obtained by multiplying the output of the adder 55 by the sign of $E_T$. The sign of $E_T$ is detected by a polarity detecting circuit 54 and the sign of $E_T$ and the absolute value $|\omega_1|$ of the primary angular frequency are applied to multiplier 51 which generates the primary angular frequency command value $\omega_1^*$.

Primary angular frequency operating means 200 corrects the primary angular frequency to regulate $E_M$ at zero based on the scheme described above. However, primary angular frequency operating means 200 differs from the corresponding part of the prior art motor drive control in that the gain of the regulating means 52 is adjusted by the multiplier 50 so as to be proportional to the variable F(x). This adjustment insures stable and smooth driving of the induction motor 2. The variable F(x) can be the magnetic flux command value $\phi_2^*$ or the magnetizing current command value $I_M^*$, which correspond to the magnetic flux intensity.

As shown in FIG. 4, primary angular frequency operating means 200 has a regulating means 52 (the first regulating means) to which the M axis induced voltage $E_M$ is applied. A multiplier 50 multiplies the output of the regulating means 52 by a variable F(x) which varies responsively to the intensity of the secondary magnetic flux. An adder 55 subtracts the output of the multiplier 50 from the absolute value of the primary angular frequency command value $|\omega_1^*|$ generated by divider 28. By lowering the gain of the regulating means 52 based on F(x), stable and smooth driving of the induction motor 2 is maintained in the field weakening range, even at times when the magnetizing current data includes fewer significant figures than the torque current data.

Figure 5:
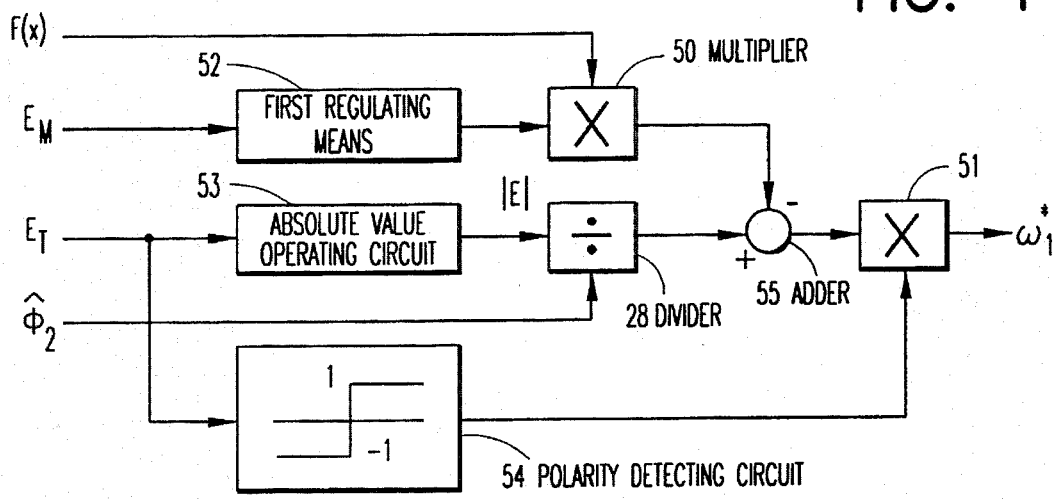
FIG. 5 is a block diagram of the second embodiment of the primary angular frequency operating means of FIG. 1.

Referring to FIG. 5, a block diagram of a second embodiment of the primary angular frequency operating means 200 of FIG. 1, is shown. The primary angular frequency operating means of FIG. 5 is different from the first embodiment of FIG. 4 in that in the embodiment of FIG. 5, the M axis induced voltage $E_M$ and the T axis induced voltage $E_T$ are input to the magnitude operating circuit 53. The magnitude operating circuit 53 outputs an absolute value of the induced voltage vector which is given by equation 12:

$$|E| = \sqrt{(E_M^2 + E_T^2)} \quad (12)$$

In the embodiment of FIG. 5, the primary angular frequency command value $\omega_1^*$ is represented by equation 1.

Figure 6:
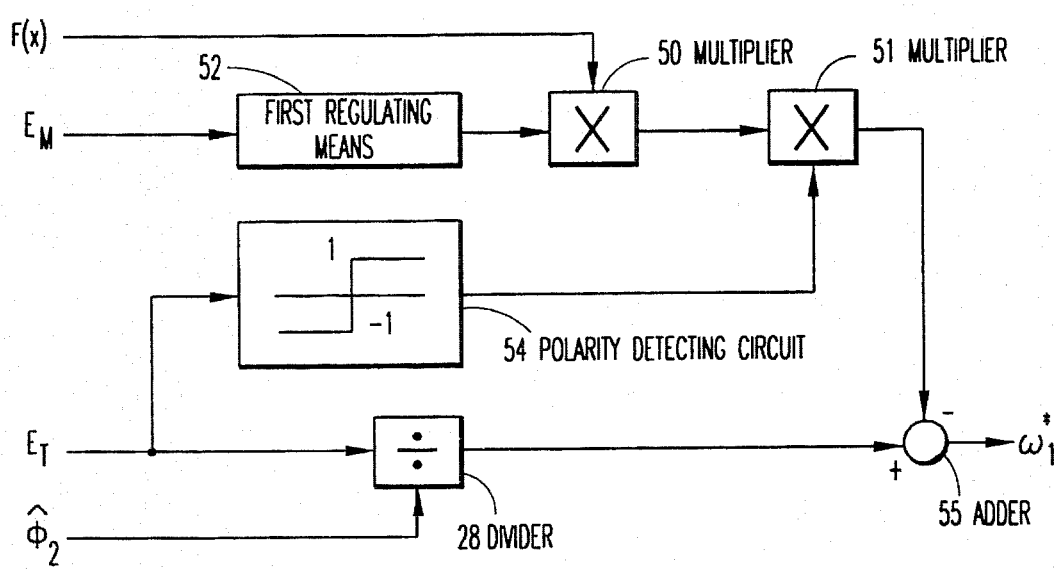
FIG. 6 is a block diagram of the third embodiment of the primary angular frequency operating means of FIG. 1.

Referring to FIG. 6, a block diagram of a third embodiment of the primary angular frequency operating means 200 of FIG. 1, is shown. The primary angular frequency operating means of FIG. 6 is different from the first embodiment of FIG. 4 in that the T axis induced voltage $E_T$ is input directly to the divider 28. In addition, the multiplier 51 is connected between multiplier 50 and adder 55. The output of multiplier 50 is applied to multiplier 51, which multiplies output of multiplier 50 by the sign of $E_T$, obtained from polarity detecting circuit 54. The output of multiplier 51 is applied to a negative input of the adder 55. The output of divider 28 is applied to the positive input of adder 55 which generates the primary angular frequency command value $\omega_1^*$.

Referring to FIG. 7, a block diagram of a fourth embodiment of the primary angular frequency operating means 200 of FIG. 1, is shown. The primary angular frequency operating means 200 of FIG. 7 is similar to the configuration of FIG. 4, except that in the embodiment of FIG. 7, a frequency correction value is added, by an adder 62, to the primary angular frequency command value $\omega_1^*$. The frequency correction value is output by a second regulating means 61. Second regulating means 61 performs P or P-I control based on the output of adder 60. Adder 60 subtracts an actual torque current value $I_T$ from the torque current command value, or adder 60 subtracts an actual torque value (or a calculated torque value) $\tau$ from a torque command value $\tau_*$. The difference signal from adder 60 is applied to an input of second regulating means 61. Second regulating means 61 performs P or P-I control to regulate the difference between the inputs at zero.

The embodiment of FIG. 7 maintains stable and smooth driving of the induction motor, even in the low speed driving range, where the induced voltage is low, by correcting the primary angular frequency command value $\omega_1^*$ using the torque or torque current values, whose data include more significant figures than the data representing the induced voltage.

Figure 8:
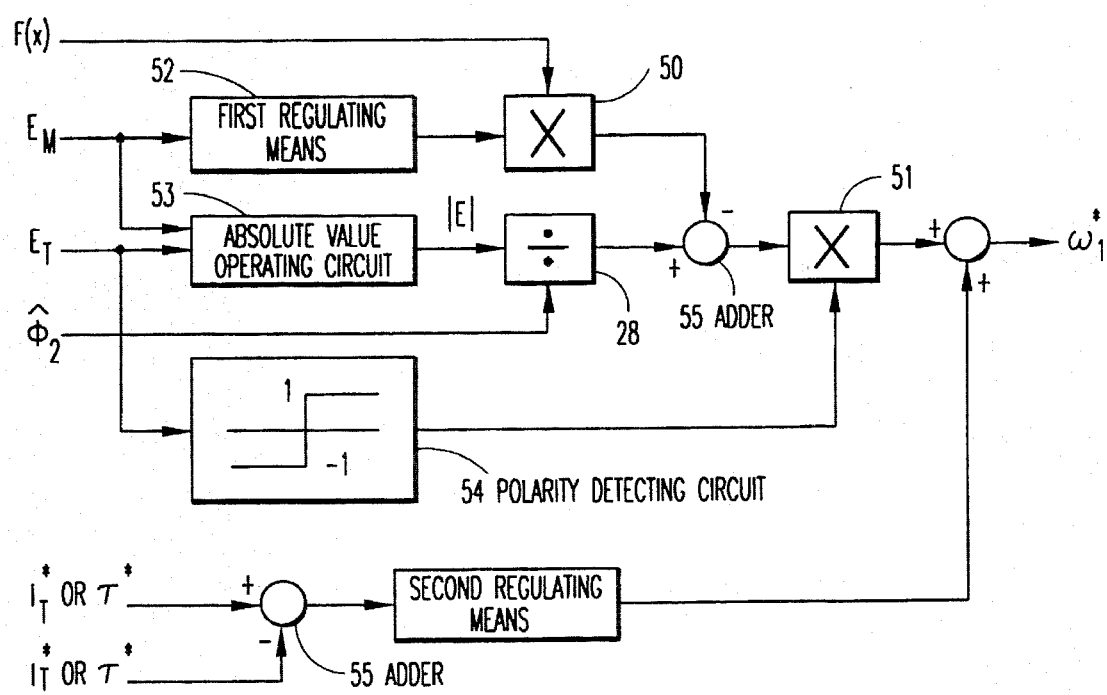
FIG. 8 is a block diagram of the fifth embodiment of t he primary angular frequency operating means of FIG. 1.

Referring to FIG. 8, a block diagram of a fifth embodiment of the primary angular frequency operating means 200 of FIG. 1, is shown. The primary angular frequency operating means of FIG. 8 includes the arrangement of the second embodiment of FIG. 5. In addition, this embodiment includes an adder 62 which adds a frequency correction value to the primary angular frequency command value $\omega_1^*$. The correction value is generated in this embodiment in the same way as in the fourth embodiment of FIG. 7.

Figure 9:
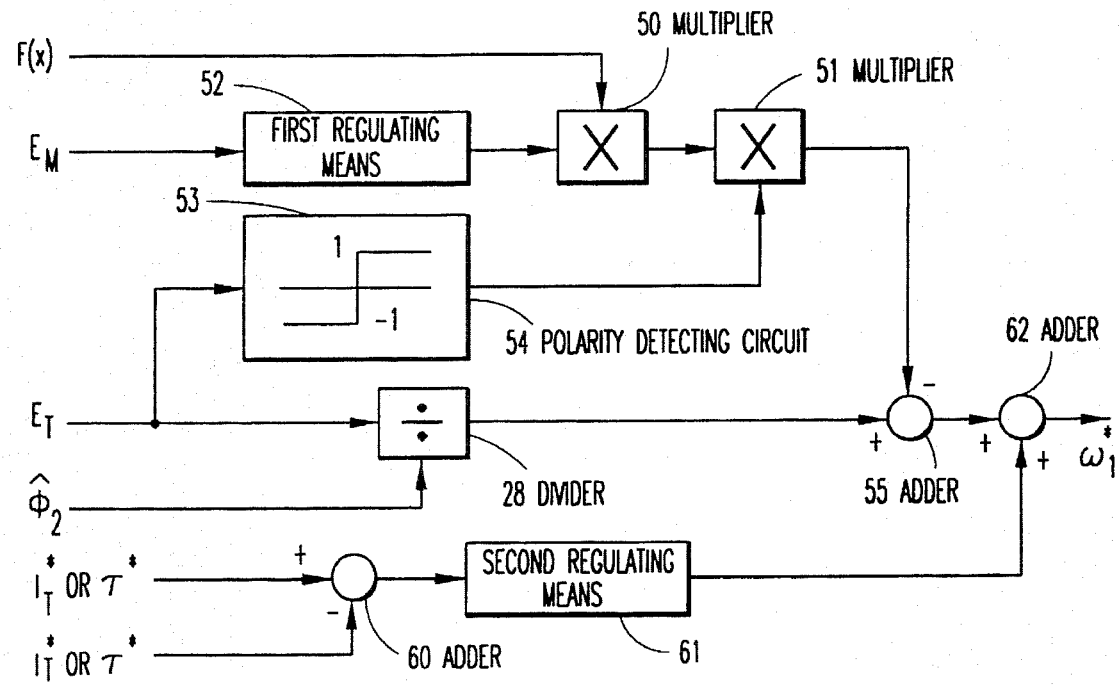
FIG. 9 is a block diagram of the sixth embodiment of the primary angular frequency operating means of FIG. 1.

Referring to FIG. 9, a block diagram of a sixth embodiment of the primary angular frequency operating means 200 of FIG. 1, is shown. The primary angular frequency operating means of FIG. 9 includes the arrangement of the third embodiment of FIG. 6. In addition, this embodiment includes an adder 62, which adds a frequency correction value to the primary angular frequency command value $\omega_1^*$. The correction value is generated in this embodiment in the same way as in the fourth embodiment of FIG. 7.

Figure 10:
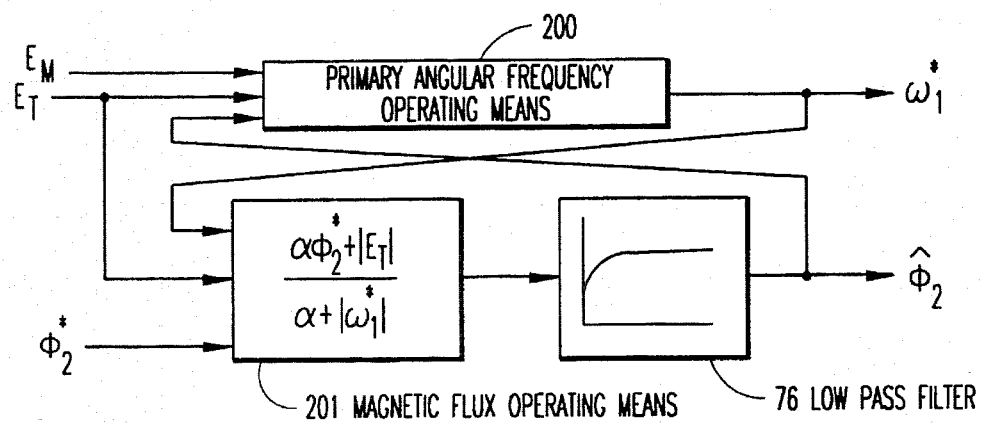
FIG. 10 is a block diagram showing the connections between the primary angular frequency operating means and the magnetic flux operating means of FIG. 1.

Referring to FIG. 10, a block diagram showing connections between the primary angular frequency operating means 200 and the magnetic flux operating means 201, is shown. The magnetic flux operating means 201 generates the magnetic flux value $\phi_2$ according to equation 7 from primary angular frequency command value $\omega_1^*$, T axis induced voltage $E_T$, and magnetic flux command value $\phi_2^*$. A preliminary calculated magnetic flux value $\phi_2$ is filtered through a low pas filter 76 to generate the final calculated value of magnetic flux $\phi_2$, which varies at the time constant of the induction motor. This final calculated magnetic flux value $\phi_2$ is applied to an input of primary angular frequency operating means 200 and used in the dividing operation in divider 28 in all the above described embodiments.

Figure 11:
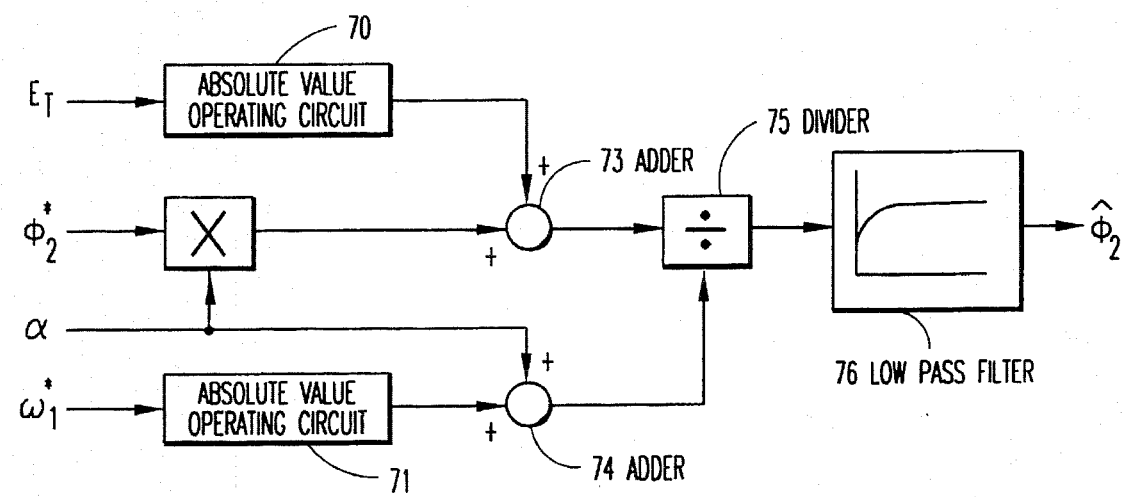
FIG. 11 is a block diagram showing the first embodiment of the magnetic flux operating means of FIG. 1.

Referring to FIG. 11, a block diagram of a first embodiment of the magnetic flux operating means 201, is shown. In FIG. 11, an absolute value operating circuit 70 generates the absolute value of the T axis induced voltage $|E_T|$ and applies the result to an adder 73. A multiplier 72 multiplies the magnetic flux command value $\phi_2^*$ by a reference frequency constant $\alpha$. Adder 73 adds the output of the absolute value operating circuit 70 and the output of multiplier 72. An absolute value operating circuit 71 generates the absolute value of the primary angular frequency command value $|\omega_1^*|$. This result is applies to an adder 74, which adds to it the reference frequency constant $\alpha$. A divider 75 divides the output of the adder 73 by the output of the adder 74. Finally the calculated magnetic flux value $\phi_2$ is obtained by filtering the output of the divider 75 through a low pas filter 76. The calculated magnetic flux value $\phi_2$, thus generated, is used as a magnetic flux equivalent in the above described embodiments of the primary angular frequency operating means 200.

The embodiment of FIG. 11 allows the calculated magnetic flux value $\phi_2$ to be obtained with minimal error from equation 7. This is true whether the primary angular frequency command value $\omega_1^*$ is substantially smaller or larger than the reference frequency value $\alpha$. Since the calculated magnetic flux value $\phi_2$ output from low pass filter 76 changes more slowly than the primary angular frequency command value $\omega_1^*$, calculated magnetic flux value $\phi_2$ and primary angular frequency command value $\omega_1^*$ can be separately calculated. Because of this, since $\phi_2$ and $\omega_1^*$ can be calculated substantially simultaneously, equation 5 can be calculated reliably.

Figure 12:
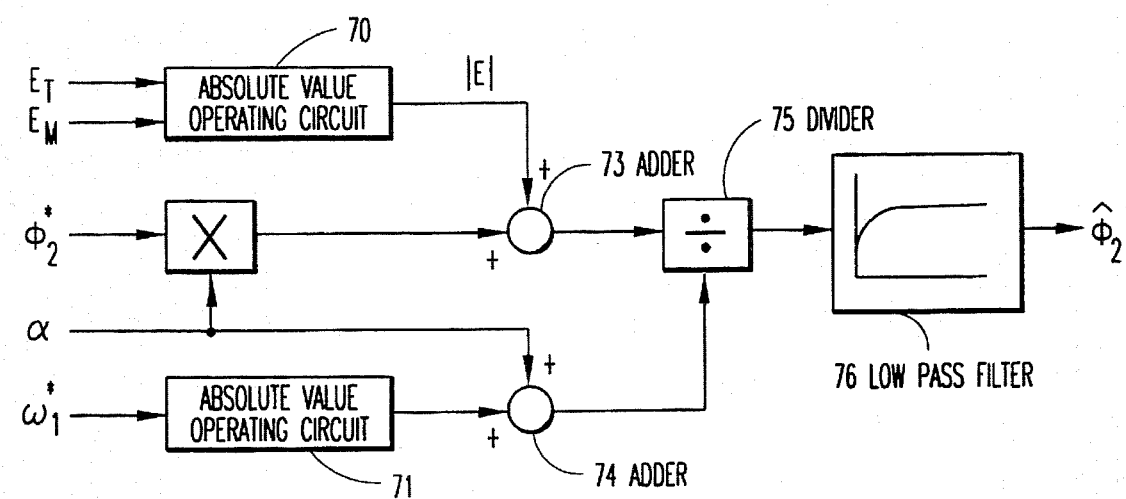
FIG. 12 is a block diagram showing the second embodiment of the magnetic flux operating means of FIG. 1.

Referring to FIG. 12, a block diagram of a second embodiment of the magnetic flux operating means 201, is shown. The embodiment of FIG. 12 differs from the first embodiment of FIG. 11 in that the absolute value operating circuit 70 calculates a magnitude of the induced voltage vector E instead of the absolute value of the T axis induced voltage $E_T$. The other aspects of this embodiment are the same as corresponding elements of the first embodiment of FIG. 11.

Figure 13:
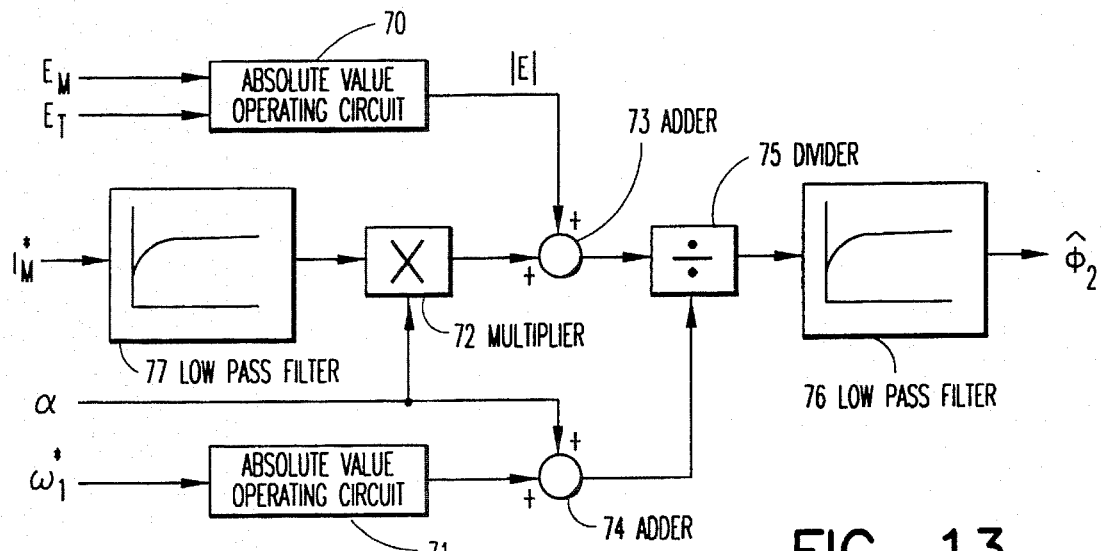
FIG. 13 is a block diagram showing the third embodiment of the magnetic flux operating means of FIG. 1.

Referring to FIG. 13, a block diagram of a third embodiment of the magnetic flux operating means, is shown. In this embodiment, the magnetic flux command value $\phi_2^*$ in the first embodiment of FIG. 11 is replaced with the magnetizing current command value $I_M^*$ filtered through a low pass filter 77. The other aspects of this embodiment are the same as corresponding elements of the first embodiment of FIG. 11.

Figure 14:
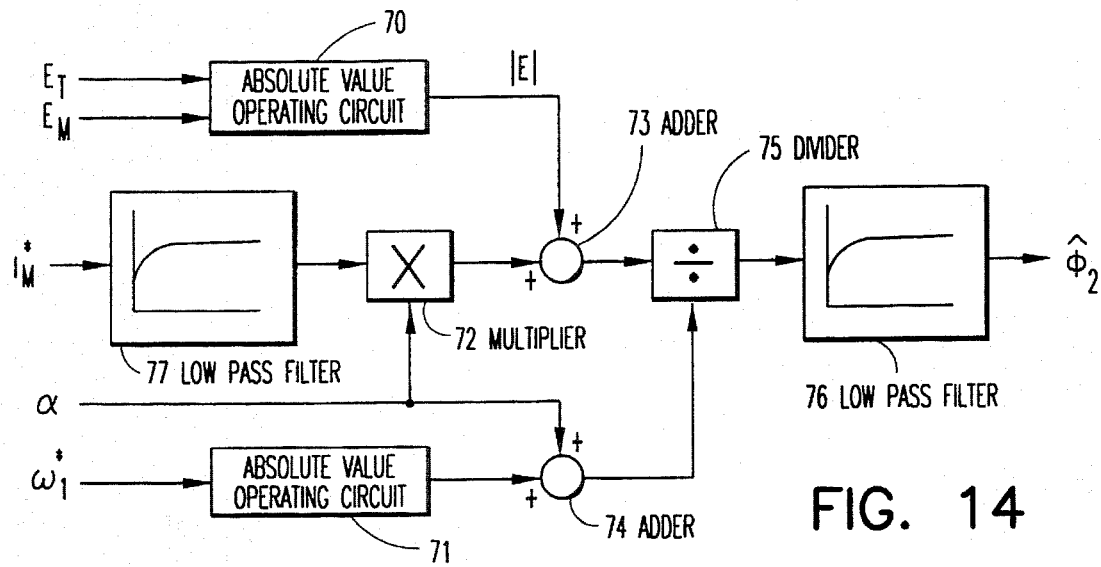
FIG. 14 is a block diagram showing the fourth embodiment of the magnetic flux operating means of FIG. 1.

Referring to FIG. 14, a block diagram of a fourth embodiment of the magnetic flux operating means. In this embodiment, the magnetic flux command value $\phi_2^*$ in the second embodiment of FIG. 12 is replaced with the magnetizing current command value $I_M^*$ filtered through a low pass filter 77. The other aspects of this embodiment are the same as corresponding elements of the first embodiment of FIG. 12.

As explained above, stable and smooth driving of an induction motor is maintained by lowering the gain of the first regulating means of the primary angular frequency operating means in the field weakening region in which the phase of the magnetic flux varies. According to the present invention, the output of the second regulating means, which regulates the torque current $I_T$ or the torque $\tau$ at the corresponding command value $\tau^*$ or $I_T^*$, is added to the output of the primary angular frequency operating means. This is done to correct the primary angular frequency value using the torque current or the torque $I_T$, $\tau$, for which data having more significant figures than the data representing the induced voltage and is detected with greater precision even in the low speed driving range, in which detected voltage is low and error in the induced voltage is relatively large. In this way, the primary angular frequency command value $\omega_1^*$ is generated with minimal error. Since the present invention generates the magnetic flux on the basis of the induced voltage in the high or middle speed driving range of the motor and on the basis of the magnetic flux command value $\phi_2^*$ in the low speed driving range in which the induced voltage detection error becomes large, the calculated magnetic flux $\phi_2$ can be calculated accurately over the entire speed range of the motor. As a result, the primary angular frequency command value $\omega_1^*$ can also be calculated accurately.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A variable speed control apparatus for an induction motor comprising:

power converting means, capable of controlling magnitude, frequency and phase of a voltage supply generated by said power converting means, for powering said induction motor;

means for detecting a primary current of said output voltage supply and resolving said primary current into a magnetizing current component and a torque current component;

means for generating an angular position of a magnetic flux, used for independently controlling said magnetizing current component and said torque current component, whereby at least a torque of said induction motor is controlled;

means for generating an induced voltage vector of said induction motor;

means for generating a magnetic flux axis component of said induced voltage vector and a torque axis component of said induced voltage vector responsively to said angular position of a magnetic flux;

first regulating means for regulating said magnetic flux axis component at zero by generating a first control signal to which said magnetic flux axis is responsive;

means for adjusting a gain of said first control signal in a field weakening operating range of said induction motor to produce a gain-adjusted control signal;

means for generating an absolute value of said torque axis component and dividing said absolute value by an equivalent of a magnetic flux of said induction motor; and means for subtracting said gain-adjusted control signal from a result of said dividing and making a polarity of a result of said subtracting equal to a polarity of said magnetic flux axis component to generate a primary angular frequency command signal.

2. A variable speed control apparatus as in claim 1, further comprising:

second regulating means for regulating one of said torque current to match a torque current command value and said torque to match a torque command value, by generating a second control signal to which said one is responsive; and means for adding said second control signal to said primary angular frequency command signal.

3. A variable speed control apparatus as in claim 2, wherein said equivalent of a magnetic flux is generated by a magnetic flux operating means, said magnetic flux operating means comprising:

means for adding a product of a magnetic flux command value and a reference frequency value to an absolute value of said torque axis component of said induced voltage vector to generate a first intermediate signal;

means for adding said reference frequency value to an absolute value of said primary angular frequency command value to generate a second intermediate signal;

means for dividing said first intermediate signal by said second intermediate signal to generate a third intermediate signal; and means for low-pass filtering said third intermediate signal to generate said equivalent of a magnetic flux.

4. A variable speed control apparatus as in claim 2, wherein said equivalent of a magnetic flux is generated by a magnetic flux operating means, said magnetic flux operating means comprising:

means for adding a product of a magnetic flux command value and a reference frequency value to a magnitude of said induced voltage vector to generate a first intermediate signal;

means for adding said reference frequency value to an absolute value of said primary angular frequency command value to generate a second intermediate signal;

means for dividing said first intermediate signal by said second intermediate signal to generate a third intermediate signal; and means for low-pass filtering said third intermediate signal to generate said equivalent of a magnetic flux.

5. A variable speed control apparatus as in claim 2, wherein said equivalent of a magnetic flux is generated by a magnetic flux operating means, said magnetic flux operating means comprising:

first means for low-pass filtering a magnetizing current command value;

means for generating a product of a low-pass filtered magnetizing current command value generated by said first means for low-pass filtering and a reference frequency value to an absolute value of said torque axis component of said induced voltage vector to generate a first intermediate signal;

means for generating an absolute value of said torque axis component of said induced voltage vector;

means for adding said reference frequency value to an absolute value of said primary angular frequency command value to generate a second intermediate signal;

means for dividing a sum of said first intermediate signal and said absolute value of said primary angular frequency command value by said second intermediate signal to generate a third intermediate signal; and means for low-pass filtering said third intermediate signal to generate said equivalent of a magnetic flux.

6. A variable speed control apparatus as in claim 2, wherein said equivalent of a magnetic flux is generated by a magnetic flux operating means, said magnetic flux operating means comprising:

first means for low-pass filtering a magnetizing current command value;

means for generating a product of a low-pass filtered magnetizing current command value generated by said first means for low-pass filtering and a reference frequency value to a magnitude of said induced voltage vector to generate a first intermediate signal;

means for generating an absolute value of said torque axis component of said induced voltage vector;

means for adding said reference frequency value to an absolute value of said primary angular frequency command value to generate a second intermediate signal;

means for dividing a sum of said first intermediate signal and said absolute value of said primary angular frequency command value by said second intermediate signal to generate a third intermediate signal; and means for low-pass filtering said third intermediate signal to generate said equivalent of a magnetic flux.

7. A variable speed control apparatus as in claim 1, wherein said equivalent of a magnetic flux is generated by a magnetic flux operating means, said magnetic flux operating means comprising:

means for adding a product of a magnetic flux command value and a reference frequency value to an absolute value of said torque axis component of said induced voltage vector to generate a first intermediate signal;

means for adding said reference frequency value to an absolute value of said primary angular frequency command value to generate a second intermediate signal;

means for dividing said first intermediate signal by said second intermediate signal to generate a third intermediate signal; and means for low-pass filtering said third intermediate signal to generate said equivalent of a magnetic flux.

8. A variable speed control apparatus as in claim 1, wherein said equivalent of a magnetic flux is generated by a magnetic flux operating means, said magnetic flux operating means comprising:

means for adding a product of a magnetic flux command value and a reference frequency value to a magnitude of said induced voltage vector to generate a first intermediate signal;

means for adding said reference frequency value to an absolute value of said primary angular frequency command value to generate a second intermediate signal;

means for dividing said first intermediate signal by said second intermediate signal to generate a third intermediate signal; and means for low-pass filtering said third intermediate signal to generate said equivalent of a magnetic flux.

9. A variable speed control apparatus as in claim 1, wherein said equivalent of a magnetic flux is generated by a magnetic flux operating means, said magnetic flux operating means comprising:

first means for low-pass filtering a magnetizing current command value;

means for generating a product of a low-pass filtered magnetizing current command value generated by said first means for low-pass filtering and a reference frequency value to an absolute value of said torque axis component of said induced voltage vector to generate a first intermediate signal;

means for generating an absolute value of said torque axis component of said induced voltage vector;

means for adding said reference frequency value to an absolute value of said primary angular frequency command value to generate a second intermediate signal;

means for dividing a sum of said first intermediate signal and said absolute value of said primary angular frequency command value by said second intermediate signal to generate a third intermediate signal; and means for low-pass filtering said third intermediate signal to generate said equivalent of a magnetic flux.

10. A variable speed control apparatus as in claim 1, wherein said equivalent of a magnetic flux is generated by a magnetic flux operating means, said magnetic flux operating means comprising:

first means for low-pass filtering a magnetizing current command value;

means for generating a product of a low-pass filtered magnetizing current command value generated by said first means for low-pass filtering and a reference frequency value to a magnitude of said induced voltage vector to generate a first intermediate signal;

means for generating an absolute value of said torque axis component of said induced voltage vector;

means for adding said reference frequency value to an absolute value of said primary angular frequency command value to generate a second intermediate signal;

means for dividing a sum of said first intermediate signal and said absolute value of said primary angular frequency command value by said second intermediate signal to generate a third intermediate signal; and means for low-pass filtering said third intermediate signal to generate said equivalent of a magnetic flux.

11. A variable speed control apparatus for an induction motor comprising:

power converting means, capable of controlling magnitude, frequency and phase of a voltage supply generated by said power converting means, for powering said induction motor;

means for detecting a primary current of said output voltage supply and resolving said primary current into a magnetizing current component and a torque current component;

means for generating an angular position of a magnetic flux, used for independently controlling said magnetizing current component and said torque current component, whereby at least a torque of said induction motor is controlled;

means for generating an induced voltage vector of said induction motor;

means for generating a magnetic flux axis component of said induced voltage vector and a torque axis component of said induced voltage vector responsively to said angular position of a magnetic flux;

first regulating means for regulating said magnetic flux axis component at zero by generating a first control signal to which said magnetic flux axis is responsive;

means for adjusting a gain of said first control signal in a field weakening operating range of said induction motor to produce a gain-adjusted control signal;

means for generating a magnitude of said induced voltage vector and dividing said absolute value by an equivalent of a magnetic flux of said induction motor; and means for subtracting said gain-adjusted control signal from a result of said dividing and making a polarity of a result of said subtracting equal to a polarity of said magnetic flux axis component to generate a primary angular frequency command signal.

12. A variable speed control apparatus as in claim 11, further comprising:

second regulating means for regulating one of said torque current to match a torque current command value and said torque to match a torque command value, by generating a second control signal to which said one is responsive; and means for adding said second control signal to said primary angular frequency command signal.

13. A variable speed control apparatus as in claim 12, wherein said equivalent of a magnetic flux is generated by a magnetic flux operating means, said magnetic flux operating means comprising:

means for adding a product of a magnetic flux command value and a reference frequency value to an absolute value of said torque axis component of said induced voltage vector to generate a first intermediate signal;

means for adding said reference frequency value to an absolute value of said primary angular frequency command value to generate a second intermediate signal;

means for dividing said first intermediate signal by said second intermediate signal to generate a third intermediate signal; and means for low-pass filtering said third intermediate signal to generate said equivalent of a magnetic flux.

14. A variable speed control apparatus as in claim 11, wherein said equivalent of a magnetic flux is generated by a magnetic flux operating means, said magnetic flux operating means comprising:

means for adding a product of a magnetic flux command value and a reference frequency value to an absolute value of said torque axis component of said induced voltage vector to generate a first intermediate signal;

means for adding said reference frequency value to an absolute value of said primary angular frequency command value to generate a second intermediate signal;

means for dividing said first intermediate signal by said second intermediate signal to generate a third intermediate signal; and means for low-pass filtering said third intermediate signal to generate said equivalent of a magnetic flux.

15. A variable speed control apparatus for an induction motor comprising:

power converting means, capable of controlling magnitude, frequency and phase of a voltage supply generated by said power converting means, for powering said induction motor;

means for detecting a primary current of said output voltage supply and resolving said primary current into a magnetizing current component and a torque current component;

means for generating an angular position of a magnetic flux, used for independently controlling said magnetizing current component and said torque current component, whereby at least a torque of said induction motor is controlled;

means for generating an induced voltage vector of said induction motor;

means for generating a magnetic flux axis component of said induced voltage vector and a torque axis component of said induced voltage vector responsively to said position of a magnetic flux;

first regulating means for regulating said magnetic flux axis component at zero by generating a first control signal to which said magnetic flux axis is responsive;

means for adjusting a gain of said first control signal in a field weakening operating range of said induction motor to produce a gain-adjusted control signal;

means for generating making a polarity of said gain-adjusted control signal equal to a polarity of said torque axis component to generate a polarized gain-adjusted signal;

means for dividing said torque axis component by an equivalent of a magnetic flux of said induction motor; and means for subtracting said polarized gain-adjusted signal from a result of said dividing to generate a primary angular frequency command signal.

16. A variable speed control apparatus as in claim 15, further comprising:

second regulating means for regulating one of said torque current to match a torque current command value and said torque to match a torque command value, by generating a second control signal to which said one is responsive; and means for adding said second control signal to said primary angular frequency command signal.

17. A variable speed control apparatus as in claim 16, wherein said equivalent of a magnetic flux is generated by a magnetic flux operating means, said magnetic flux operating means comprising:

means for adding a product of a magnetic flux command value and a reference frequency value to an absolute value of said torque axis component of said induced voltage vector to generate a first intermediate signal;

means for adding said reference frequency value to an absolute value of said primary angular frequency command value to generate a second intermediate signal;

means for dividing said first intermediate signal by said second intermediate signal to generate a third intermediate signal; and means for low-pass filtering said third intermediate signal to generate said equivalent of a magnetic flux.

18. A variable speed control apparatus as in claim 15, wherein said equivalent of a magnetic flux is generated by a magnetic flux operating means, said magnetic flux operating means comprising:

means for adding a product of a magnetic flux command value and a reference frequency value to an absolute value of said torque axis component of said induced voltage vector to generate a first intermediate signal;

means for adding said reference frequency value to an absolute value of said primary angular frequency command value to generate a second intermediate signal;

means for dividing said first intermediate signal by said second intermediate signal to generate a third intermediate signal; and means for low-pass filtering said third intermediate signal to generate said equivalent of a magnetic flux.

* * * * *